May 23, 1944. C. A. MacCORDY 2,349,359
PARKING METER
Filed Feb. 27, 1941 4 Sheets-Sheet 1
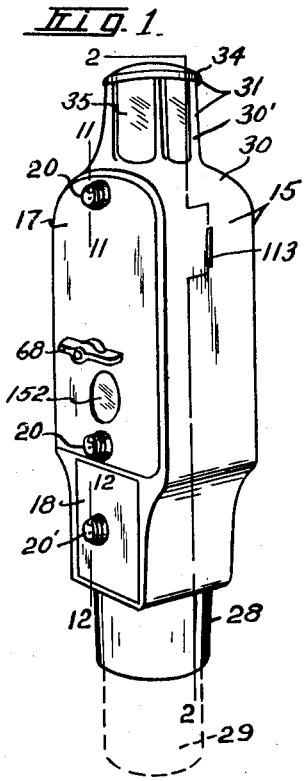
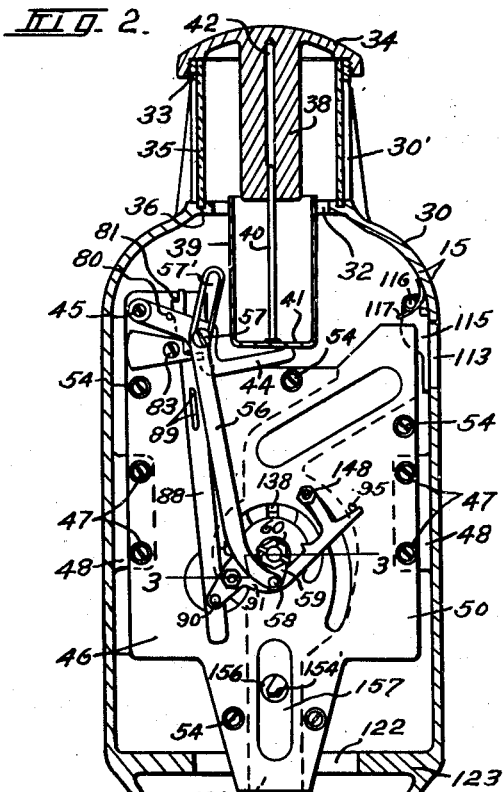
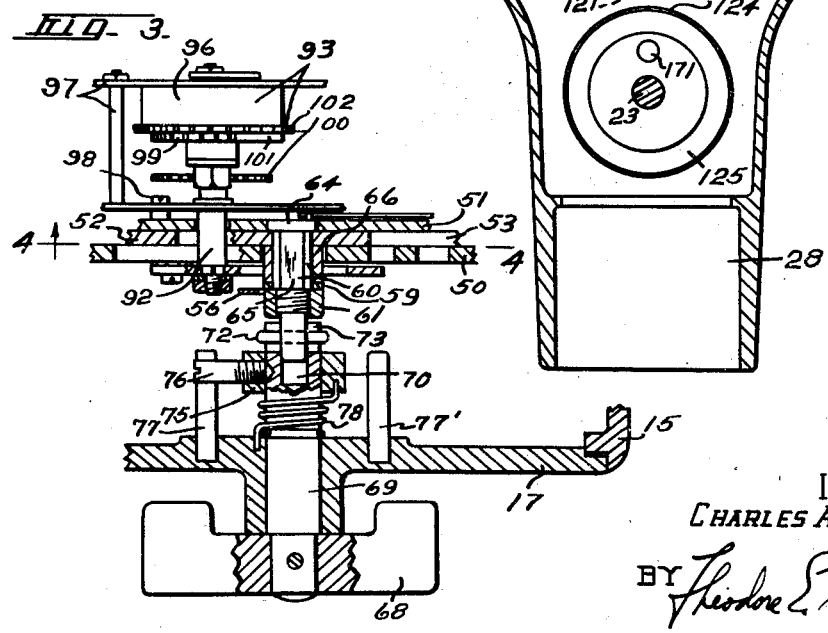
INVENTOR
CHARLES A. MacCORDY
BY Theodore E. Simonton
ATTORNEY May 23, 1944.                C. A. MacCORDY                2,349,359
                                PARKING METER
                        Filed Feb. 27, 1941           4 Sheets-Sheet 2
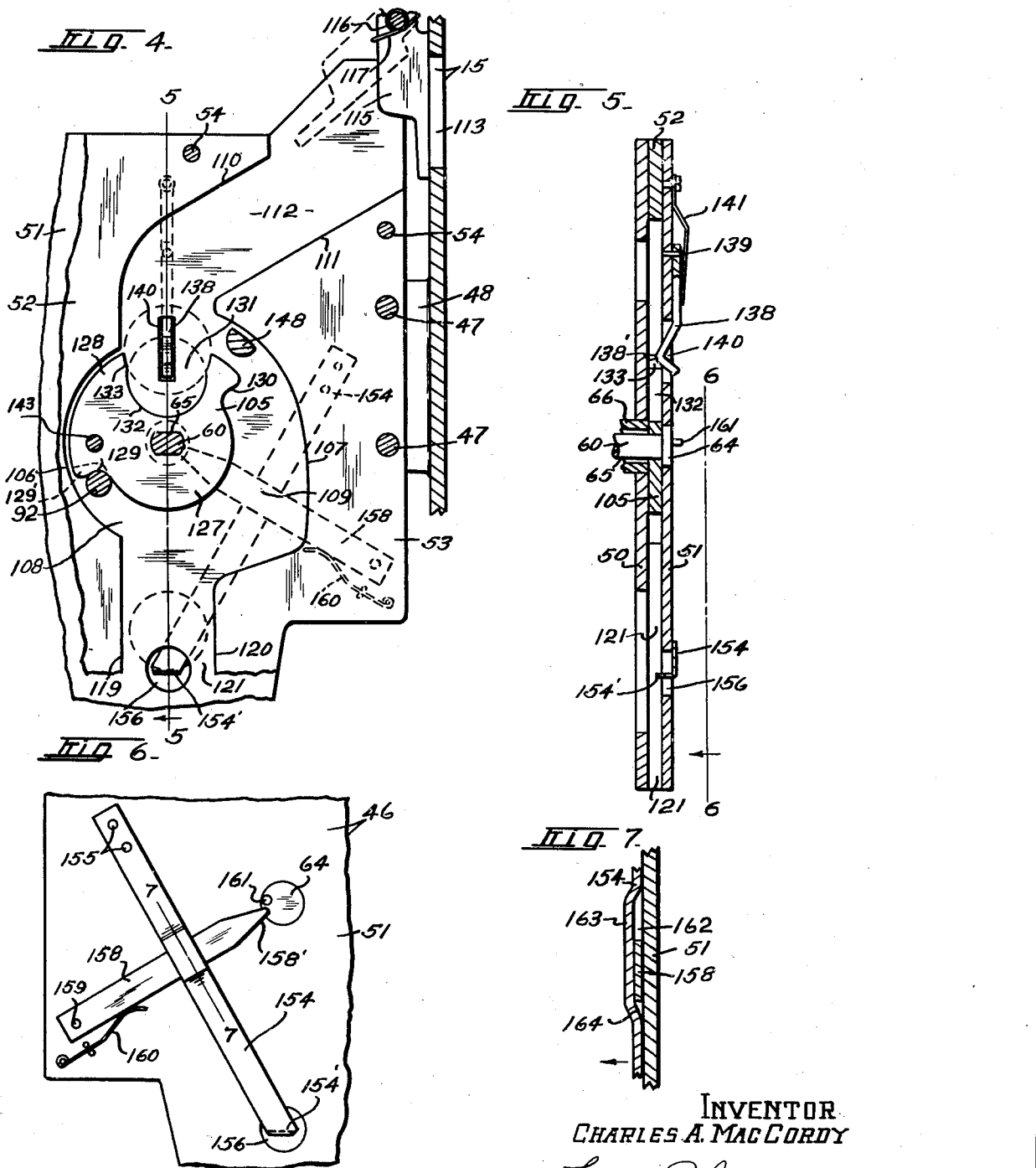
INVENTOR
CHARLES A. MacCORDY
BY
ATTORNEY May 23, 1944.  C. A. MacCORDY  2,349,359
PARKING METER
Filed Feb. 27, 1941  4 Sheets-Sheet 3
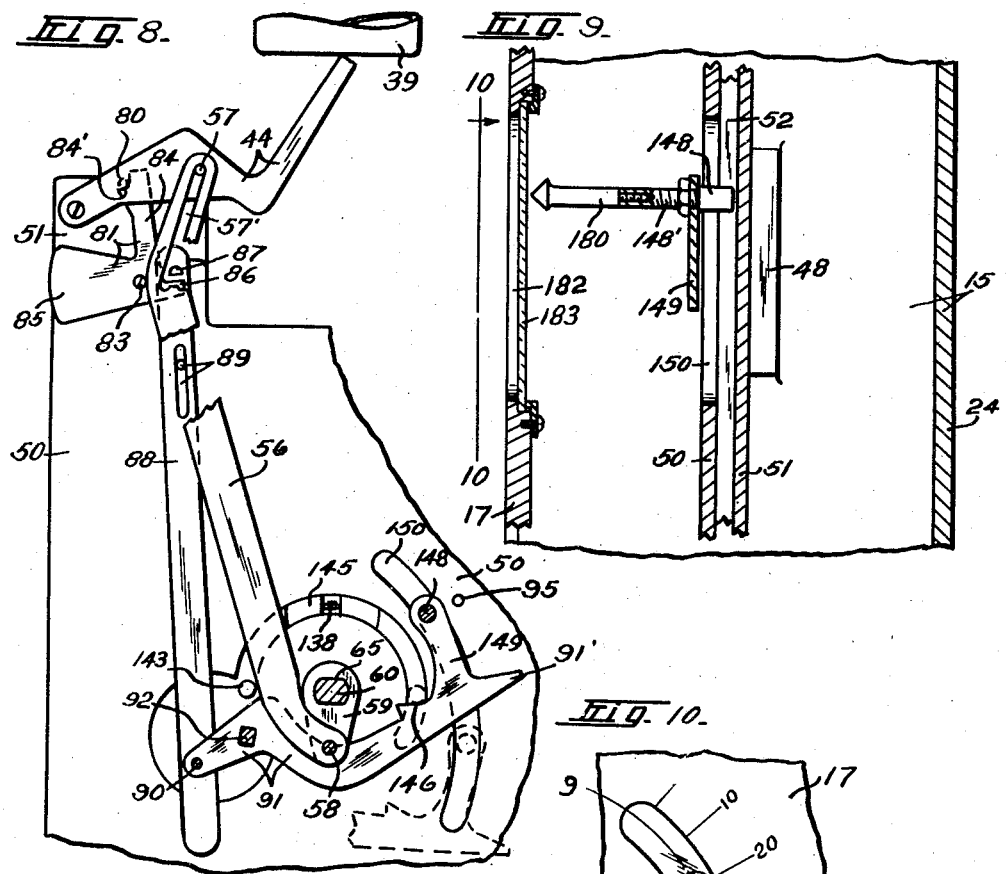
INVENTOR
CHARLES A. MAC CORDY
BY Theodore E. Simonton
ATTORNEY May 23, 1944.  C. A. MacCORDY  2,349,359
PARKING METER
Filed Feb. 27, 1941   4 Sheets-Sheet 4
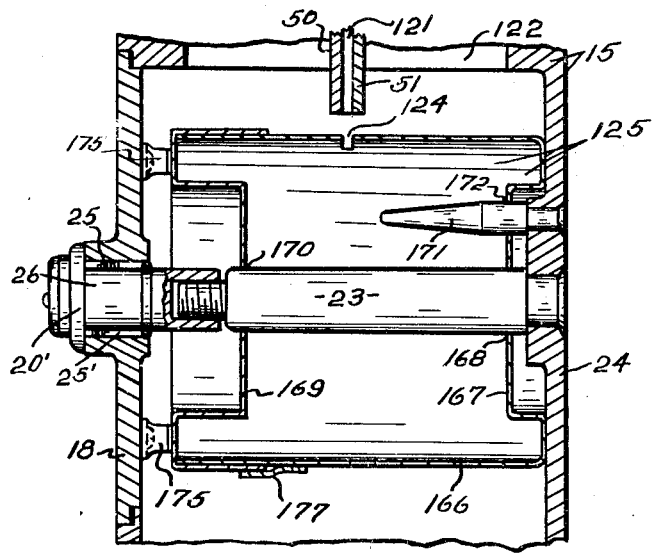
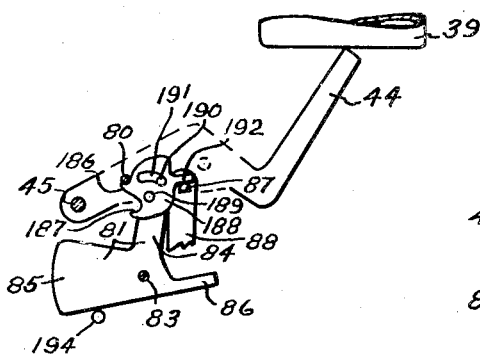
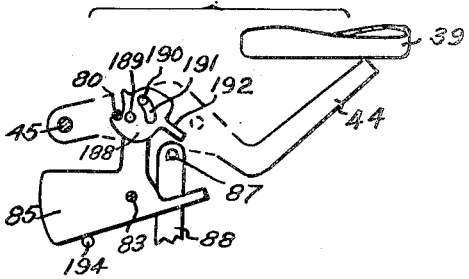
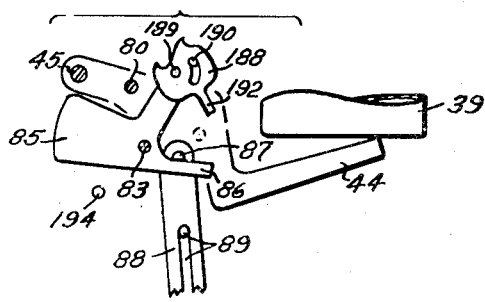
INVENTOR
CHARLES A. MacCORDY
BY Theodore E. Simonton
ATTORNEY Patented May 23, 1944

2,349,359

UNITED STATES PATENT OFFICE 2,349,359

PARKING METER

Charles A. MacCordy, Fulton, N. Y.

Application February 27, 1941, Serial No. 380,939

5 Claims. (Cl. 194—61)

My invention relates to improvements in coin controlled parking meters in which a signal is movable from a hidden or non-signaling position to an exposed or signaling position.

The primary objects of this invention are to produce a mechanism for timing the parking of vehicles and for collecting a revenue for such parking which is simple, economical and durable in construction and that is practically universal in its adaptations.

More specifically, the invention contemplates the provision of a coin controlled parking meter which may be selectively set, by minor changes in or slight adjustment of parts thereof, so that an occupant of a parking space may have the choice of either one or two parking periods. One of the latter periods may or may not be free.

For instance, my parking meter may be set or adjusted so that: First, a parking period of one length may be had by depositing in the meter a coin of a specified denomination; second, either of two parking periods of different values may be had as the occupant of a parking space may elect; a free limited parking period without depositing a coin in the meter, or a parking period of longer duration by the depositing of a coin of specified value into the meter; and third, either of two parking periods of different values may be obtained by depositing in the meter either of two coins of different predetermined values or denominations depending upon the period selected.

In addition to the above advantages, I have provided a parking meter having preferably two signals of contrasting colors, one signal being movable from a concealed non-signaling position within the meter case to an exposed signaling position in a glass dome provided at the upper end of the case. The second signal is fixedly mounted in the dome so as to be plainly visible when the first signal is in the concealed position. The signals are so constructed and mounted that when the movable signal is in the signaling position, the fixed signal is partially or wholly contained within the movable signal and correspondingly concealed thereby.

In many instances or localities where traffic often becomes congested, it is, of course, desirable that unnecessary traffic be maintained at a minimum. Furthermore, it is well known that in instances where the parking meters record the unexpired parking time, persons looking for a vacant parking space often drive about seeking a vacant space having considerable unused time remaining so that such space may be used without depositing a coin. This increases traffic and in order to effect a reduction in traffic in such instances, it is desirable that prospective users of a parking space be unable to determine the amount remaining, if any, of parking time paid for by a previous user of a vacant parking space.

Another feature of my parking meter resides in the provision of a signal operating means so constructed and operated that the unexpired time of a specific parking period may not be determined by an observer.

A further object is to produce a parking meter of the above mentioned class which may be readily caused to indicate the duration of the unexpired parking time so that in instances or localities where this is desired, it may be readily determined.

Another object of this invention is to provide a parking meter with simple, efficient means by which the duration of a parking period obtained by the insertion of a coin of a predetermined denomination may be readily varied as desired.

A still further object of the invention is to provide a parking meter with a signal so constructed and operated, that when the signal is in the signaling position, the same may be quickly and easily observed from all sides of the parking meter.

A still further object of the invention resides in providing a parking meter whereby a limited free parking period may be obtained and to provide the meter with signal means for indicating when the meter and parking space are being so used.

Another specific object is to provide an improved coin receptacle and particularly one which is compact, efficient and easily accessible.

These and other objects and advantages pertaining to the specific construction of the parking meter will more readily appear from the following description taken in conjunction with the accompanying drawings in which:

Figure 1 is a perspective view of a parking meter embodying the various features of this invention.

Figure 2 is an enlarged vertical sectional view taken substantially in the plane of line 2—2, Figure 1.

Figure 3 is a detail transverse sectional view taken substantially on line 3—3, Figure 2.

Figure 4 is an enlarged detail vertical sectional view taken substantially in the plane of the line 4—4, Figure 3.

Figure 5 is an enlarged vertical sectional view taken on line 5—5, Figure 4.

Figure 6 is a fragmentary rear view of the apparatus shown in Figures 4 and 5 as viewed from line 6—6, Figure 5, illustrating a coin holding and release mechanism.

Figure 7 is a detail sectional view taken on line 7—7 of Figure 6.

Figure 8 is a fragmentary face view illustrating the position of the various parts of the mechanism when the movable signal is in the signaling position.

Figure 9 is an enlarged detail vertical sectional view taken substantially in the plane of the line 9—9, Figure 10, illustrating a novel means for indicating the unexpired legal parking time.

Figure 10 is a fragmentary face view of the case as viewed from line 10—10, Figure 9.

Figure 11 is a detail vertical sectional view taken on line 11—11 of Figure 1.

Figure 12 is an enlarged detail vertical sectional view through the parking meter case taken substantially on line 12—12, Figure 1.

Figures 13, 14 and 15 are detail face views illustrating a modified form of holding means for the movable signal whereby the signal may be maintained in a partial signaling position as well as in a full signaling position.

As shown more particularly in Figures 1 to 7 inclusive of the drawings, my parking meter comprises a case 15 having two openings in one side thereof arranged one above the other, which are closed by doors or cover plates 17 and 18 respectively. The cover plate 17 is secured to the case 15 by a pair of lock members 20 which have screw threaded engagement with suitable lugs 21 formed integral with the case 15 in the manner illustrated in Figure 11. The cover plate 18 is secured to the case 15 by a lock member 20' similar to the lock members 20 and which has screw threaded engagement with a spindle 23 extending through the case 15, said spindle being secured to the rear wall 24 of the case as illustrated in Figure 12. These lock members 20 and 20' may be of any suitable construction and as illustrated in the drawings are provided with tumbler plates 25 normally projecting beyond the periphery of the barrel 26 of the lock into corresponding grooves 25', as illustrated in Figures 11 and 12, for maintaining the lock against rotation. These tumbler plates are moved inwardly out of cooperative relation with the grooves 25' by a suitable key, not shown, inserted into the barrel of the lock from the outer end thereof so as to permit the lock to be turned into or out of screw threaded engagement with the case 15 or member, as a lug 21 and the spindle 23, carried thereby.

The case 15 has the lower end thereof provided with a socket 28 adapted to receive the upper end of a suitable post 29 for maintaining the case in an upright position as indicated in Figures 1 and 2.

The upper end 30 of the case 15 is provided with a dome 31 comprising a plurality of, in this instance 3, upwardly projecting ribs or posts 30' arranged in substantially uniform circumferential spaced relation to each other about an aperture 32 provided in the upper end 30 of the case. The upper ends of the ribs 30' are tied together by an annular ring 33 which has the outer peripheral surfaces thereof provided with screw threads engaged by a cap 34. Mounted between the ribs 30' is a cylindrical glass window 35 which extends downwardly from the cap 34 to the upper end 30 of the case 15. The window 35 is secured in position by the cap 34, the lower end of said window being positioned in a suitable annular groove 36 formed in the end 30 intermediate the aperture 32 and ribs 30' as shown in Figure 2.

The cap 34, as shown in Figure 2, is preferably provided with a pendant cylindrical boss 38 to provide a signal arranged in axial alignment with the aperture 32 and which is of considerably less diameter than that of said aperture. The lower end of the member 38 preferably terminates at or slightly below the upper face of the aperture 32. The outer circumferential surface of member 38 is provided with a suitable color, such as red, so as to be readily seen through the window 35 from any angle about the meter case 15.

The meter case is provided with a second signal 39 which, as shown in Figure 2, is a tubular cup-shaped member normally positioned beneath the signal 38 and which is adapted to receive readily the signal 38 therein when moved upwardly into the dome 31. The signal 39 may have the outer peripheral surface thereof coated with paint or suitable material to provide a color, such as green, which contrasts with that of the exterior surface of the signal 38. The signal 39 is maintained in substantially coaxial relation with the signal 38 by means of a stem 40 secured to its bottom 41 and which extends upwardly through the signal and is slidably received in a suitable bore 42 provided in the signal 38.

The movable signal 39 is supported against downward vertical movement by a rock lever 44 having one end engaging the bottom 41 of the signal, and its other end pivotally connected by a shouldered screw 45, or its equivalent, to the upper end of a vertically disposed supporting frame 46 mounted in the case 15 intermediate the front and rear walls thereof, said frame being secured to said case by screws 47 engaging inwardly projecting lugs 48 formed integral with the case 15 at opposite sides thereof.

The frame 46, in this instance, is composed of a plurality of plates; a front plate 50, a rear plate 51 and plate sections 52 and 53 arranged in spaced relation to each other intermediate the plates 50 and 51. These plates are secured together by the screws 47 and also by additional screws 54, as shown in Figures 2 and 4. The pivotal movement of the rock lever 44 is controlled by a vertically disposed arm 56 which has the upper end thereof secured to the lever 44 intermediate the ends thereof by a pin 57 and slot 57'. The lower end of the arm 56 is pivotally connected at 58 to a rock arm 59 secured to a stub shaft 60 by a nut 61, as shown in Figure 3.

The shaft 60 is journaled in the frame plates 50 and 51, as shown in Figures 3 and 5, some distance below the signal 39. The inner end of the shaft 60 may as shown be provided with an enlarged circular head 64. The portion of the shaft intermediate the head and nut 61 is provided with a flattened portion 65 which receives the arm 59 and causes the arm to rotate in unison with the shaft. A spacing sleeve 66 is shown in Figures 3 and 5 as being on the shaft at the rear of the arm 59 and which extends through the forward plate 50 of the frame. The shaft 60 is manually rotated by means of a lever 68 positioned exteriorly of the cover plate 17 and which is secured to the outer end of a stub shaft 69 journaled in said plate as shown in Figure 3. The inner end of shaft 69 is provided with an axial recess 70 which receives the forward end of the shaft 60 therein. The shaft 69 is operatively connected with the shaft 60 by means of a pin 72 extending diametrically through said shaft and through a diametrically disposed slot 73 provided at the inner end of the shaft 69. A collar 75 carrying a pin 76 is secured to the shaft 69 in inwardly spaced relation to the plate 17 while a pair of stop members or pins 77 and 77' are secured to the plate 17 at opposite sides of the shaft 69 in position to be engaged by the pin 76 for limiting the rotary movement of the shaft 69. The pin 76 and the pins 77 and 77' are so related that the shaft 69 may be rotated substantially one hundred eighty degrees. A spring 78 mounted upon the shaft 69 normally urges the shaft 69 in an anti-clockwise direction and maintains pin 76 in engagement with the pin 77. The relation of the pin 76 and the arm 59 on shaft 60 is such that when said pin is in engagement with pin 77, the arm 59 will extend downwardly from the shaft 60. The throw of the arm 59 is such that when said arm is moved one hundred eighty degrees from its lowermost position to its uppermost position, the signal 39 will be moved to its uppermost position within the dome 31.

The signal 39 and lever 44 are releasably maintained in their uppermost positions by the engagement of a latch pin 80 secured to the arm 44 with a keeper or detent 81. This keeper or detent 81 is an L-shaped member pivotally connected adjacent the apex thereof by a screw, or the like, 83 to the supporting frame 46. One of the arms, as 84, of the keeper extends upwardly from the pivot 83 and has a stop shoulder or keeper element 84' adapted to be moved into engagement with pin 80 for maintaining the arm 44 against downward movement. The arm 84 is urged toward the latch pin 80 by the horizontally disposed arm 85 of the keeper 81. The keeper 81 is also provided with an extension 86 arranged at the opposite side of the pivot 83 to that of the arm 85, in the path of movement of a pin or lug 87 on the upper end of a vertically disposed arm 88. The upper end portion of the arm 88 is guided by a pin and slot connection 89, during the reciprocative movement of the arm. The lower end of the arm 88 is pivotally connected at 90 to one end of a control lever 91 which is secured to the drive shaft 92 of a drive mechanism 93 mounted at the rear of the supporting frame 46. The shaft 92, as shown more particularly in Figures 2 and 8, is positioned a short distance below and at one side of the shaft 60. The lever 91 extends from the shaft 92 across the front of frame 46 beneath the shaft 60 and has the outer end 91' thereof adapted to engage the stop pin 95 secured to the plate 50 for limiting the upward movement of the lever, which, in this instance, is normally urged in an anti-clockwise direction by the operation of the drive mechanism 93.

The drive mechanism 93 in this instance is of a clock-work construction and comprises a spring motor 96 operatively connected to the shaft 92 and with a frame 97 which in turn is secured to the supporting frame 46, as by screws 98. The shaft 92 is journaled in the frame 97 and has secured thereto a drive gear 99 which in turn is operatively connected with a train of gears 100 by means of pawls 101 secured to a gear 102 journaled on shaft 92. The pawls 101 are arranged to drive the gear 102 in one direction so that the shaft 92 is free to turn in the opposite direction independently of the train of gears. The gear 102 is comprised in the train of gears 100 which are operatively connected with a suitable escapement mechanism, not shown, for controlling the speed of operation of the shaft 92 in a manner well known to those skilled in clock-work construction. Inasmuch as the particular manner in which the shaft 92 is driven does not constitute a novel feature of this invention, it is believed that further disclosure or description of the drive mechanism is not necessary. While I have indicated the drive mechanism 93 as being of clock-work construction, I do not wish to be limited to such a mechanism as it is obvious that other means such as a weight or an electrically operated drive mechanism may be utilized in place of the clock-work for actuating the drive shaft 92.

The movement of the control lever 91 from the inoperative to the operative position thereof is manually produced through the medium of the handle 68 and the shafts 69 and 60 in the following manner: On the shaft 60 is mounted a control disk 105 which, as shown more particularly in Figures 4 and 5, is positioned between the plate sections 52 and 53 intermediate the front and rear plate members 50 and 51 of the supporting frame 46. This disk 105 is mounted on the flattened portion 65 of the shaft 60 so as to rotate in unison with said shaft. The plate members 52 and 53 have the opposed edge surfaces 106 and 107 thereof adjacent the disk 105 curved in opposite directions to provide a chamber 108 for the disk. The curved surface 107 of the plate 53 is spaced some distance from the adjacent side of the disk 105 to provide a coin passage 109. The adjacent edges 110 and 111 of the plates 52 and 53 positioned above the chamber 108 extend upwardly and laterally in spaced relation to each other to provide a downwardly inclined coin chute 112 communicating with chamber 108 and which has the upper end thereof terminating in registration with a coin slot 113 provided in the case 15 as shown in Figure 4. A closer flap 115 may as shown in Figures 2 and 4 be hingedly connected as at 116 to the case 15 at the inner side thereof for closing the coin slot 113. A spring 117 may be utilized for urging the flap 115 to the closed position. The adjacent edges 119 and 120 of the plates 52 and 53 positioned beneath the chamber 108 are arranged in vertical spaced relation to each other to provide a coin chute 121 which extends downwardly through an aperture 122 in a partition 123 formed in the case 15 and which registers with a suitable coin aperture 124 provided in a coin box 125 mounted in the case 15 beneath the partition 123, the structure of which will be more fully described hereinafter.

As shown more particularly in Figure 4, the shaft 92 extends through the chamber 108 adjacent the edge 106 of the plate 52. The drive disk 105 is formed with two concentric portions 127 and 128 of different diameters which provide shoulders 129 and 130 at the junction of the ends thereof adapted to engage the shaft 92 and limit the rotary movement of the disk. The shoulder 129 is so positioned that when in engagement with the shaft 92, the arm 59 is maintained in its lowermost position as illustrated in Figures 2 and 8, and thereby maintain the pin 72 connected to the shaft 60 in alignment with the recess 73 provided in the shaft 69 when the stop pins 76 and 77 are maintained in engagement with each other by the spring 78. The upper enlarged portion 128 is provided with a coin receiving aperture 131 which, when the shoulder 129 is in contact with the shaft 92, is in alignment with the lower inner end of the coin chute 112 for receiving a coin therefrom. This aperture 131 comprises two coin sockets 132 and 133 of different diameters for receiving coins of correspondingly different denominations. The lowermost socket 132 is of smaller diameter than the uppermost socket 133 and, as shown, is of substantially the same diameter as a one cent piece, while the larger socket 133 is of substantially the same diameter as that of a five cent piece. The sockets 132 and 133 are so positioned with respect to the shaft 60 that when the disk 105 is rotated, a coin contained in socket 132 is moved through the inner side of the passage 109 in spaced relation to the outer edge 107 thereof, and a coin carried in socket 133 is moved through the outer portion of the passage 109 in close proximity with the side 107 of said passage.

The disk 105 is normally maintained against rotation by a lock detent 138 removably mounted on the rear side of the frame 46 by a pin 139 as shown in Figure 5. This detent has an end 138' which extends through an aperture 140 provided in the rear plate 51 and into the coin receiving aperture 131 into the path of movement of disk 105. The detent 138 is yieldingly urged to its operative position by a spring 141 pivotally secured to the plate 51 with the free end thereof normally in pressure engagement with the detent. As shown in Figures 4 and 5 a coin passing from the chute 112 into the coin receiving aperture 131 engages the inner end 138' of the detent 138 and forces the same outwardly against the action of the spring 141 and maintains said end out of the path of movement of the portion 128 of the drive disk 105 so that said disk may be freely rotated in a clockwise direction as viewed in Figure 4.

The disk 105 is provided with a drive pin 143 arranged in this instance in the portion 128 at the rear of the coin aperture and in proximity to the stop shoulder 129. The drive pin 143 extends forwardly from the disk through an arcuate slot 145 provided in the front plate 50 in concentric relation with the shaft 60, as shown in Figure 8. During rotation of the drive disk 105, the drive pin 143 comes into engagement with a shoulder or contact surface 146 provided on the control lever 91 in inward spaced relation to the end portion 91' of said lever. Contact of the drive pin 143 with the surface 146 produces rotation of the lever in a clockwise direction until the disk 105 reaches the end of its forward movement. It will be obvious that inasmuch as the drive pin 143 is spaced, when the drive disk is in its normal inoperative position, a considerable distance from the surface 146, the arm 91 will be rotated only a relatively short distance during the rotation of the drive disk one hundred eighty degrees movement. This movement of lever 91 may, of course, be varied depending upon the location circumferentially of the drive pin 143 with respect to the stop shoulder 129.

When a coin of larger denomination is received in the socket 133, this larger coin comes into contact with a drive pin 148 carried by an upwardly projecting arm 149 provided on the lever 91 intermediate the shoulder 146 and the outer end portion 91' of said lever. The pin 148 extends inwardly through an arcuate slot 150 provided in the front plate 50, in concentric relation with the shaft 92, the inner end of said pin extending into the coin passage 109 adjacent the outer surface thereof. It will now be observed that a coin carried in the socket 133 will engage the drive pin 148 after the disk 105 has moved but a short distance from its initial inoperative position and thereby produce a greater pivotal movement of the control lever 91 in a clockwise direction than when said lever is actuated by the drive pin 143 and provide a correspondingly longer parking period. The degree of movement of the control lever 91 produced by the engagement of a coin with the pin 148 may be readily changed by substituting for one pin 148 another pin having a greater or smaller diameter. During this rotation of the disk 105 in a clockwise direction, the shoulder 129 moves beyond the lock detent 138, thereby permitting the end 138' of said detent to be moved into the disk chamber 108 and therefore into the path of movement of the portion 128 when the disk is being returned to its normal initial position. The shoulder 129 may, therefore, be beveled at the rear side thereof as indicated at 129', Figure 4, so as to readily move the detent end 138' rearwardly out of the chamber 108 and permit the disk 105 to readily return to its initial position.

As hereinbefore stated, the keeper shoulder 84' and latch pin 80 are so related that the shoulder will swing beneath the pin just prior to the pin and the arm 44 reaching their uppermost positions. It is preferable, therefore, that the coin be maintained in the aperture 131 until just prior to the disk 105 reaching its extreme forward movement or until the pin 80 has moved upwardly beyond the shoulder 84'. The contour of the outer edge 107 of the coin passage 109 is, therefore, formed so that the movable signal is substantially in its uppermost position when the coin is released from operative relation with the drive disk, with the result that substantially a full half revolution of the disk must be produced before the coin is deposited into the chute 121.

As the coin passes downwardly through the chute 121, it comes into registration with a window 152 provided in the cover plate 17. In order that the coin may remain in registration with the window so as to be observed from the exterior of the case 15, I have provided a coin holder which in this instance comprises a resilient arm 154 composed preferably of spring metal and which is secured at one end, as by rivets 155, to the rear face of the frame 46, as shown in Figure 6. The other end of the holding arm 154 is provided with a laterally disposed projection or stop element 154' which extends forwardly from the arm through an aperture 156 in the rear plate 51 and into the coin chute 121. The front plate 50 of the supporting frame 46, as shown more particularly in Figure 2, is provided with an elongated slot 157 which is in alignment with the aperture 156 and the window 152 so that a coin intercepted by the stop arm 154 may be readily observed through the window from the exterior of the case 15. In order that the stop arm 154 may be actuated to release a coin prior to the entrance of a succeeding coin into the chute 121, I have provided an actuating arm 158 arranged in substantially radial relation with the shaft 60 and substantially normal to the stop arm 154. Arm 158 is pivotally secured at one end, as by a rivet 159, to the rear plate 51 of the supporting frame. A spring 160 maintains the free end 158' of arm 158 in the path of movement of a drive pin 161 secured to the head 64 of the shaft 60. The arm 158 extends through an elongated recess 162 provided intermediate the arm 154 and the plate 51, as indicated in Figure 7, by pressing an intermediate portion 163 of arm 154 laterally. The junction of the lower end of the portion 163 and the main portion of the arm 154 provides a cam surface 164 arranged adjacent the lower edge of the arm 158 when said arm is in its normal position. Downward pivotal movement of the arm 158 produced by the pin 161 causes said arm to engage the cam element 164 and spring the lower end portion 154' of arm 154 rearwardly out of the path of movement of a coin maintained thereby in the chute 121 and thus release the coin. As soon as the pin 161 moves beyond the end 158' of the arm 158, spring 160 returns said arm to its initial position thereby permitting the stop arm 154 to assume its normal position with the end thereof extending into the chute 121 to intercept a succeeding coin and hold the same in alignment with the window 152. It will be understood that as the shaft 60 is returned to its initial position, the pin 161 will raise the arm 158 until said pin passes beyond the end 158'; whereupon the arm 158 returns to its normal position in engagement with the spring 160 adjacent the cam element 164.

As the coin is released by the stop arm 154, it passes downwardly through the chute 121 and aperture 124 into the hereinbefore mentioned coin box or receptacle 125. This coin box, as shown more particularly in Figures 2 and 12, comprises a cylindrical cup-like body member 166 having the aperture 124 arranged in the side wall thereof, as shown, to align with the chute 121. This member 166 has the bottom 167 provided with an aperture 168 arranged substantially centrally thereof adapted to receive the spindle 23 therethrough. The open end of the body member 166 is closed by a suitable cover 169 which likewise has a centrally disposed aperture 170 adapted to receive the spindle 23. In order that the coin receiving slot 124 may be maintained in alignment with the chute 121, I have provided a guide pin 171 which is secured to the rear wall 24 of the case 15 and which extends through an aperture 172 provided in the bottom 167 of the receptacle; also a pair of flat leaf springs 175 are secured to th. inner face of the cover plate 18 to engage diametrically opposite sides of the cover 169 and yieldingly urge the receptacle 125 to its innermost position as the cover plate is secured to the spindle 23. It is now obvious that the coin receptacle 125 may be readily removed from the case 15, after the cover plate 18 has been removed, by simply withdrawing the receptacle from engagement with the spindle 23 and guide pin 171, and that the coin box or receptacle may be as readily returned to the case by inserting the same on the spindle 23 and pin 171. In order that the contents of the coin box may not be misappropriated, the cover 169 may be secured to the member 166 by any suitable means as by one or more strips of adhesive tape 177.

It will now be understood that the operation of the parking meter illustrated in Figures 1 to 7 of the drawings is substantially as follows: Assuming that the movable signal 39 is in its lowermost non-signaling position, it will be obvious that the fixed signal 38 may be readily observed through the window of dome 31 and thus indicate that the meter is inoperative and that the parking space controlled by said meter is, or should be, vacant. When it is desired to set the meter for a legal parking period, a coin of greater or smaller denomination, depending upon the length of the parking period desired, is inserted through the coin slot 113. The coin then moves downwardly through the chute 112 and lodges in one of the sockets 132 or 133 depending upon the denomination of the coin. As the coin enters the socket, the lock detent 138 is actuated thereby to unlock the drive disk 105. The disk 105 is now rotated in a clockwise direction from the exterior of the case through the medium of the handle 68. If the coin used is of the smaller denomination and registers in the socket 132, the disk 105 will rotate freely in a clockwise direction until the drive pin 143 engages the control lever 91 at the surface 146; whereupon continued rotation of the disk in a clockwise direction will produce a corresponding rotation of the control lever 91, until the disk 105 has moved about 180° and the coin is deposited into the coin chute 121. The handle 68 is now released and the shaft 60 and disk 105 are returned to their initial positions by the action of the spring 78. The lever 91, of course, remains in its lowered position to be gradually returned to its uppermost position in engagement with the stop 95 by the drive mechanism 93. As the shaft 60 is rotated in a clockwise direction, the signal 39 will be moved to its uppermost position through the action of the arms 59 and 56 and the engagement of the pin 57 with the lower end of the slot 57'. The actuating member 87 will also be moved out of engagement with the extension 86 on the latch 81 by the upward movement of the pivot 90 and arm 88. This upward movement of the element 87 releases the latch member and arm 85 and causes the keeper 84' to move into position to engage the pin 80 and thus maintain the arm 44 and signal 39 in their uppermost positions. Swinging movement of the control lever 91 in a clockwise direction sets the drive mechanism into operation which in turn slowly returns the control lever to its initial position in engagement with the stop 95. The operation of the drive mechanism stops as the load produced thereon by the resistance of the stop pin to the movement of lever 91 overcomes the action of the drive mechanism. As lever 91 engages the pin 95, the element 87 engages the extension 86 of the keeper 81 and produces sufficient rotation of said keeper to bring the shoulder 84' out of engagement with the pin 80 and thereby releases the arm 44 after which the signal 39 and arm 44 will return by gravity to their lowermost inoperative positions.

If a coin of the larger denomination is used, the same will lodge in the socket 133. It now follows that upon rotation of the shaft 60 and disk 105 in a clockwise direction, the engagement of the larger coin with pin 148 will move the control lever 91 in a clockwise direction until the coin moves out of engagement with the pin due to the travel of the coin being in eccentric relation to that of the pin 148. As the coin passes out of engagement with the pin 148, further downward movement of the lever 91 will cease while the coin will continue to move with the disk until the same registers with the coin chute 121, whereupon the coin moves from the socket 133 into said chute. It will be understood that when the control lever 91 is operated by the coin of the larger denomination, the arms 56 and 88 will be actuated in the same manner as when using the coin of the smaller denomination with the exception that arm 88 will move upwardly a correspondingly greater distance than formerly. The upward movement of the arm 56 will, of course, bring the signal 39 into a signaling position while the upward movement of the arm 88 merely releases the keeper member 81.

As the coin drops through the chute 121, it will, of course, be intercepted by the stop arm 154 and be maintained in registration with the window 152. As the next succeeding coin is moved by the disk 105 into registration with the chute 121, the previous coin will be released during the initial movement of the disk by the engagement of the pin 161 with the arm 159. As soon as the first coin is released and passes beyond the arm 154, said arm will return to its normal position for intercepting the next coin which passes downwardly through the chute 121.

If it is desired to provide a limited free parking period, all that is necessary to do to adjust the parking meter for this result is to remove the lock detent 138 from the supporting frame 46. This removal of the lock detent is readily accomplished by merely swinging the spring 141 about its attachment screw as a pivot to bring the same out of contact with the lock detent; whereupon said detent is withdrawn from its holding pin 140. The meter is then operated in the same manner as before described with the exception that it is not necessary to deposit a coin of the smaller denomination into the meter. When the lock detent is removed, the drive disk 105 is always free to be moved one-half revolution by the handle 68. When moving the disk without a coin in the socket 132, the drive pin 143 engages the control lever 91 in the manner hereinbefore described and moves the same in a clockwise direction a limited degree, so as to provide for a limited parking period. If a parking period of longer duration is desired, this may be had by inserting a coin of proper denomination into the slot 113. This coin moves into the socket 133, so that the lever 91 is actuated, by the engagement of the coin with the pin 148, to produce a maximum legal parking period.

It will be observed that when the movable signal 39 is operated in the manner before described, the signal remains in its uppermost signaling position throughout the entire legal parking period and will suddenly drop to the concealed non-signaling position at the end of the parking period as the pin 80 is released by the keeper member 81.

If it is desired to indicate the unexpired legal parking time after the signal 39 has been moved to the signaling position, whether for a minimum parking period or for the maximum parking period, the structure shown in Figures 8, 9, and 10 is used. The structure shown in these three figures is constructed and operated substantially the same as that shown in Figures 1 to 7 inclusive, as above described, with the exception that the control arm 91 is provided with a pointer 180 which as illustrated in Figure 9 may be operatively connected with an extension 148' of the drive pin 148. This pointer 180 extends forwardly from the lever 91, or the extension 149 thereof, to a position in close proximity to the cover plate 17. The cover plate 17 is provided with an arcuate slot 182 arranged concentric with the axis of rotation of the lever 91; that is, with the shaft 92 and in the line of travel of pointer 180. Mounted on the cover plate 17 at the inner side of the slot 182 is a glass window 183. Any suitable scale such as indicated at 184, Figure 10, may be provided on the cover plate 17 adjacent the slot 182 for indicating units of time. This scale may, however, be provided on the glass 183 at the inner side thereof to cooperate with the pointer 180 for indicating the distance in time the pointer 180 is from its normal uppermost position.

In Figures 13, 14 and 15, I have illustrated a modified form of holding means for the movable signal 39. This holding means is adapted to indicate to an observer whether the parking meter is being used for providing a minimum, limited parking period or an extended, maximum parking period. In the structure shown the keeper 81, instead of being provided with one stop shoulder or keeper element as shown in Figures 2 and 8, has two stop shoulders or keeper elements, as 186 and 187, arranged in vertical spaced relation to each other for engagement with the latch pin 80. These stop shoulders in this instance, instead of being fixedly formed on the keeper member 81, are provided on a disk member 188 which is pivotally connected at 189 to arm 84 of the keeper member. The pivotal movement of the disk 188 is limited by a pin 190 mounted on the upper end of the latch member and which extends through an arcuate slot 191 provided in the disk. The swinging movement of the disk and the pivotal connection thereof with the keeper 81 is such that when one of the stop shoulders is moved into the path of movement of the pin 80, the other stop shoulder is moved out of said path of movement. The disk 188 is provided with an extension 192 extending outwardly from the inner side thereof into the path of movement of the actuating element or pin 87 on the arm 86. The construction of the extension 192 is such that the preponderance of weight is at the opposite side of the pivot 189 from that of the keeper elements 186 and 187 so that the disk is normally maintained in the position shown in Figure 14 with the lower stop shoulder 187 in the path of movement of the pin 80. The extension 192 is so connected with the disk 188 that when the pin 87 moves to a position intermediate its lowermost and uppermost positions, as the parking meter is being set for a limited or shorter parking period, this pin 87 will not come into engagement with the extension 192. Therefore, the keeper element 187 will remain in position to engage the pin 80 on its downward movement at a position intermediate the lowermost and uppermost positions thereof and maintain the arm 44 and signal 39 in a correspondingly intermediate position. It is preferable that the keeper element 187 be so arranged that the signal 39 will be maintained thereby with its upper end substantially midway between the upper and lower ends of the window 35 so that substantially equal portions of the signals 38 and 39 may be observed through said window.

In operation the keeper member is normally maintained, when the parking meter is inactive by the engagement of the pin 87 with the latch extension 86, in the position illustrated in Figure 15, that is, with the disk 188 at one side of the path of movement of latch pin 80. As the pin 87 moves upwardly and releases the keeper during the initial clockwise movement of the control lever 91, the keeper rocks about its pivot 83 until the disk 188 is brought to such a position that the stop shoulder 187 is in the path of movement of the pin 80. This rocking movement of the keeper member 81 is limited by a stop pin 194 secured to the supporting frame 46. During the upward movement of the pin 80, the disk 188 is engaged by said pin and moved to one side by rocking movement of the keeper 81 and/or of the disk 188. If the meter is set for the shorter or limited parking period, the pin 87 will move to an intermediate position so that the disk 188 remains in its normal position with relation to the keeper member, and the arm 44 will move downwardly with the arm 86 until the pin 80 engages the keeper element 187 as shown in Figure 14. The signal 39 is thereby held in an intermediate position and the arm 86 will continue its downward movement independently of the arm 44. When the parking period has expired, the keeper member 81 is moved about its pivot 83 by the engagement of the pin 87 with the extension 86 to the position shown in Figure 15 where the keeper element 187 is moved out of engagement with the latch pin 80, thereby permitting the arm 44 and signal 39 to return to their lowermost positions. If the parking meter is set for the longer or maximum parking period, it will be observed that the pin 87 will be moved to its uppermost position and will come into contact with the disk extension 192, produce rotation of the disk, and bring the keeper element 186 into the path of movement of the pin 80 and the keeper element 187 out of said path of movement. During the initial downward movement of the pin latch 80 from its uppermost position, it will be engaged by the keeper element 186 and the signal 39 will be maintained in its uppermost position thereby. At the expiration of the parking period, the keeper member will again be actuated by the pin 87 to move the keeper element 186 out of engagement with the pin 80 so that the signal may again return to its lowermost position.

Although I have shown and particularly described the preferred embodiments of my invention, I do not wish to be limited to the exact constructions shown, as various changes both in the form and relation of the parts thereof may readily be made without departing from the spirit of the invention as set forth in the appended claims.

I claim:

1. In a parking meter, in combination; a driving mechanism adapted to operate at a given speed for either of two periods of time; a case for said mechanism having a signaling zone; a signal mounted for vertical reciprocative movement into and out of the signaling zone; holding means including a pair of keeper elements, each element being movable from an operative to an inoperative position for releasably maintaining the signal in a corresponding one of two vertically spaced signaling positions in said zone, one position for each operating period of the driving mechanism; and means actuated by the driving mechanism at the end of either one of said predetermined periods of operation thereof for moving the operative keeper element out of its operative position to release the signal, whereby said signal may move downwardly out of the signaling zone.

2. In a parking meter, a casing, a pendent and normally visible stationary signal mounted in said casing, a hollow legal parking signal mounted within the casing for vertical movement upwardly from a normal concealed non-signaling position to a visible signaling position in which the stationary signal is concealed therein, a supporting member for said legal parking signal shiftable to lift said signal to signaling position, latch means biased to automatically latch the supporting member against return movement when the legal parking signal is moved to signaling position, time-controlled means for releasing said latch means to permit the legal parking signal to drop to non-signaling position, coin-releasable means manually shiftable to cause actuation of said time-controlled means, and means operable by such manual shifting of said coin-releasable means and having a thrust connection with said supporting member to cause the latter to lift the legal parking signal to its latched signaling position, said casing including means through which the stationary signal is normally visible from all directions around the meter.

3. In a parking meter, a vertically disposed pendent and plug-like stationary signal having an axial bore extending upwardly from its lower end, said stationary signal being normally exposed to view entirely around its axis from the exterior of the meter, a vertically reciprocable legal parking signal having a tubular wall adapted to substantially entirely surround the stationary signal and having an axial guide stem slidably engaged constantly in the bore in said stationary signal, said legal parking signal being normally lowered into a concealed position exposing the stationary signal, manually operable spring-returned means to lift said legal parking signal into a signaling position in which it substantially entirely conceals the stationary signal, means to automatically lock the legal parking signal in signaling position, and time-controlled means to release said legal parking signal and permit it to drop to its normal concealed position to expose the stationary signal upon lapse of a predetermined legal parking time interval following locking of the legal parking signal in its said lifted signaling position.

4. In a parking meter, a legal parking signal shiftable vertically from a normal concealed position to a higher signaling position in which it is visible from points entirely around the meter; a coin carrier oscillative a fixed distance about a horizontal axis; a handle for turning the carrier in one direction to a coin discharge position; a spring for restoring the carrier to a normal coin-receiving position; said carrier having a coin-receiving pocket with stepped side walls to receive and drive either of two coins of different diameters; means operable by rotation of the carrier by said handle to lift the legal parking signal to signaling position; means for automatically latching the legal parking signal in signaling position; time-controlled means to permit the legal parking signal to drop to its normal concealed position; means movable bodily with said carrier to initiate an operation of the time-controlled means for one legal parking time interval; and means carried by said time-controlled means and engageable and shiftable solely by a coin of the larger of said two diameters, while the coin is being driven by the carrier, to thereby initiate an operation of the time-controlled means for a longer legal parking time interval.

5. In a parking meter having time-controlled means including a member movable from a normal idle position to which it is automatically returned at a predetermined rate, a coin carrier manually shiftable from a normal coin-receiving position to a coin-discharging position, a spring for restoring the carrier to normal position, said carrier having means to receive and drive therewith a coin of either of two different diameters, means fixed to the carrier and engageable with said member to move it one distance from idle position upon a manual shift of the carrier from coin-receiving position to coin-discharging position, means on said member engageable solely by a coin of the larger of said two diameters upon driving of such coin by the carrier to shift said member a greater distance from its normal position, a vertically reciprocable legal parking signal, means operable by manual shifting of the carrier to lift said legal parking signal from a normal concealed position to an exposed signaling position, means for automatically latching said legal parking signal in signaling position, and means operable by said member substantially at the end of the return movement of the member to unlatch the signal latching means and permit the legal parking signal to drop to its normal concealed position.

CHARLES A. MacCORDY.